United States Patent
Ungerank et al.

(10) Patent No.: US 9,469,048 B2
(45) Date of Patent: Oct. 18, 2016

(54) POLYIMIDE POWDER HAVING HIGH THERMOOXIDATIVE STABILITY

(71) Applicant: Evonik Fibres GmbH, Schoerfling am Attersee (AT)

(72) Inventors: Markus Ungerank, Perg (AT); Christian Maurer, Roitham (AT); Dieter Danzer, Laakirchen (AT); Harald Roegl, Wallern an der Trattnach (AT); Juergen Eder, St. Georgen im Attergau (AT)

(73) Assignee: EVONIK FIBRES GMBH, Schorfling am Attersee (AT)

( * ) Notice: Subject to any disclaimer, the term of this patent is extended or adjusted under 35 U.S.C. 154(b) by 0 days.

(21) Appl. No.: 14/571,451

(22) Filed: Dec. 16, 2014

(65) Prior Publication Data
US 2015/0166730 A1 Jun. 18, 2015

(30) Foreign Application Priority Data
Dec. 17, 2013 (EP) ..................................... 13197869

(51) Int. Cl.
| | | |
|---|---|---|
| *C08G 73/10* | (2006.01) | |
| *B29B 9/12* | (2006.01) | |
| *C08K 3/00* | (2006.01) | |
| *C08K 5/00* | (2006.01) | |
| *C08L 79/08* | (2006.01) | |
| *B29L 31/00* | (2006.01) | |
| *B29K 79/00* | (2006.01) | |

(52) U.S. Cl.
CPC ............... *B29B 9/12* (2013.01); *C08G 73/105* (2013.01); *C08G 73/1042* (2013.01); *C08G 73/1067* (2013.01); *C08G 73/1071* (2013.01); *C08K 3/0008* (2013.01); *C08K 5/0008* (2013.01); *C08L 79/08* (2013.01); *B29K 2079/08* (2013.01); *B29L 2031/772* (2013.01); *Y10T 428/2998* (2015.01)

(58) Field of Classification Search
CPC .......... B29K 2079/08; C08G 73/1042; C08G 73/1071; C08G 73/1067; B29C 43/006; B29C 67/04
See application file for complete search history.

(56) References Cited

U.S. PATENT DOCUMENTS

| | | | |
|---|---|---|---|
| 4,874,835 A | 10/1989 | Berdahl | |
| 2009/0093581 A1* | 4/2009 | Swei .................. | C08K 9/04 |
| | | | 524/496 |
| 2009/0093608 A1 | 4/2009 | Rushkin et al. | |
| 2009/0170992 A1* | 7/2009 | Rushkin ............. | C08K 3/22 |
| | | | 524/403 |

FOREIGN PATENT DOCUMENTS

| | | |
|---|---|---|
| EP | 1236756 A1 | 9/2002 |
| WO | WO-2007/009652 A1 | 1/2007 |

* cited by examiner

*Primary Examiner* — Gregory Listvoyb
(74) *Attorney, Agent, or Firm* — Reed Smith LLP; Eric J. Evain; Ryan P. Cox

(57) ABSTRACT

The invention relates to shaped bodies having high thermooxidative stability, which can be produced by means of direct forming and hot compression molding processes, and to a novel polyimide powder for production thereof and to a process for production of this polyimide powder.

16 Claims, No Drawings

POLYIMIDE POWDER HAVING HIGH THERMOOXIDATIVE STABILITY

The invention relates to shaped bodies having high thermooxidative stability, which can be produced by means of direct forming and hot compression moulding processes, and to a novel polyimide powder for production thereof and to a process for production of this polyimide powder.

High-temperature polyimides (softening point >300° C.) are commercially available as powders or mouldings. The products Vespel® from DuPont, Meldin® 7000 from Saint Gobain, Plavis® from Daelim and Upimol® from UBE are available on the market only in the form of mouldings, while the products P84® NT1 and P84® NT2 from Evonik Fibres are also sold as powders. Ensinger produces Sintimid mouldings having the TECASINT® brand name from this powder. The first three products are chemically identical; they are produced from pyromellitic dianhydride and 4,4'-diaminodiphenyl ether. Upimol® is produced from biphenyltetracarboxylic dianhydride and diaminodiphenyl ether or phenylenediamine. P84® NT1 and P84® NT2 are block copolymers according to WO 2007009652 A1.

U.S. Pat. No. 5,886,129 teaches that polyimides prepared from BPDA (3,3',4,4'-biphenyltetracarboxylic dianhydride) and phenylenediamine have good thermooxidative stabilities when the ratio of p-phenylenediamine (p-PDA) to m-phenylenediamine (m-PDA) is greater than 60 to 40. Comparative examples of polyimides prepared with other monomers (3,3',4,4'-biphenyltetracarboxylic dianhydride with ODA (4,4'-diaminodiphenyl ether) or PMDA (pyromellitic dianhydride) with ODA) show comparatively lower thermooxidative stabilities.

All the aforementioned products have properties that are still in need of improvement. Thus, the thermooxidative stability of P84® NT1 and NT2 is in need of improvement. Moreover, the preparation of a block copolymer is more complicated than that of a random copolymer.

Vespel® and its derivatives and Upimol® have the following disadvantages:
  the powder is not available on the open market,
  the semifinished product can be produced only by the hot isostatic pressing method; production is therefore inconvenient and costly,
  it is suspected that the production process is a complex multistage process.

EP 1 236 756 A1 discloses polyimides which are to have good thermal stability and are used therein as a laminate of polyimide plus metal in electrical circuits. However, as shown in the comparative examples of the present invention, the polyimides of EP 1 236 756 A1 likewise have unsatisfactory thermooxidative stability for the fields of use which are the subject of the present invention.

There is therefore still a need for novel shaped bodies having very good thermooxidative stability, which can be produced either by means of direct forming or by means of hot compression moulding processes.

It was therefore an object of the present invention to provide novel shaped bodies and polymer powders for production thereof, which have the disadvantages of the prior art shaped bodies and polymer powders only to a reduced degree, if at all. Processes for production thereof are also to be provided.

A specific object may be considered that of providing a polymer powder of particularly good suitability for production of mouldings in a direct forming and/or compression moulding process.

In a further specific object, the shaped bodies and the polymer powders are to have a high thermooxidative stability, i.e. a minimum loss of mass at temperatures greater than or equal to 400° C. in an air stream.

A particular object can likewise be regarded as being that of providing shaped bodies having better mechanical processibility than TECASINT® 1000.

A further specific object was that the mouldings produced from the process according to the invention can be sintered without gas bubbles and inclusions and have surfaces having a high quality, and the edges thereof can have small radii of curvature without loss of material.

The inventive shaped bodies and polymer powders should be producible in a simple and inexpensive manner.

Further objects, not explicitly mentioned, will become apparent from the overall context of the ensuing description, examples and claims.

The objects are achieved by the inventive shaped bodies according to either of claims 1 and 2, a process for production thereof according to claim 3, the inventive polyimide powder according to claim 4 and a process for production thereof according to claim 9. Preferred configurations of the present invention are disclosed in the dependent claims, and in the description and the examples.

The inventors have found that, surprisingly, shaped bodies produced from a raw powder comprising an inventive polyimide powder, and the inventive polyimide powder itself, have excellent thermooxidative stability. This means that they have only a very small loss of weight even after being exposed to an air flow at temperatures above 400° C. for a prolonged period. As shown in the examples and the comparative examples, the inventive powders show distinct advantages here over P84® NT1 and NT2. The higher thermooxidative stability leads to advantages in the use of the inventive shaped bodies at relatively high temperatures (>300° C.), since stability to oxygen is improved and hence the lifetime at a given temperature is prolonged, or higher use temperatures are permissible.

Compared to U.S. Pat. No. 5,886,129, in the inventive polyimide polymers, 1 to 40 mol % of the p-PDA/m-FDA mixture has been replaced by 4,4'-ODA. This achieved a reduction in costs, even though it was ensured at the same time that the material continues to have very good processibility by the direct forming process and by the hot compression moulding process. The reduction in costs arises from the fact that the use of ODA results in less of the costly BPDA being required in the polyimide in order to produce 1 kg of each polymer. Proceeding from U.S. Pat. No. 5,886,129, this achievement was not foreseeable.

While the specific BET surface area of the inventive polyimide powder does not appear to have any significant effect in the hot compression moulding process, the inventors have found that, surprisingly, it is directly correlated to the direct forming capacity thereof.

With the inventive polyimide powder, it has therefore been possible to provide a high-performance polymer powder, especially for the hot compression moulding and direct forming processes.

In contrast to P84 NT1 and NT2, the polymer present in the inventive polyimide powder is not a block copolymer but a random copolymer, the preparation of which is simpler and less expensive.

The polymer present in the inventive polyimide powder is produced from inexpensive monomers available on the industrial scale, which likewise leads to economic advantages.

With the inventive polyimide powder, manufacturers of mouldings can themselves produce compounds and mouldings without in-house polymer production. This option is not open to them with polyimides known in the prior art, since they are available only as a moulding or semifinished product.

Before the invention is illustrated in detail hereinafter, some terms will be defined more specifically.

"Polyimide powder" corresponds to a powder produced from a polyimide polymer. Inventive polyimide powders are preferably the powders obtained from the process according to the invention by steps i) to v) elucidated in detail hereinafter.

"Raw powder" is understood to mean the powder from which the shaped body is produced. The raw powder may comprise a plurality of different polyimide powders, at least one of which is an inventive polyimide powder. If a plurality of different polyimide powders are present, preferably more than 50% by weight, more preferably more than 70% by weight, even more preferably more than 80% by weight, especially preferably more than 90% by weight and very especially preferably more than 95% by weight of the polyimide powder content in the raw powder is inventive polymer powder. In the most preferred variant, the raw powders comprise, as polyimide powder, exclusively inventive polyimide powder. If the raw powder comprises exclusively an inventive polyimide powder, the "raw powder" corresponds to the "polyimide powder".

As well as polymer powders, the raw powder may also comprise further additives. In this case, the raw powder is also referred to as "compound". The composition of such compounds is elucidated in detail below.

The inventive shaped bodies are produced from a raw powder comprising a polyimide powder, whose polyimide polymer is composed of at least one aromatic tetracarboxylic dianhydride component (A) and at least one diamine component (B), characterized in that
  at least one aromatic tetracarboxylic dianhydride component (A) consists to an extent of 60 to 100 mol % of 3,3',4,4'-biphenyltetracarboxylic dianhydride (BPDA) and to an extent of 40 to 0 mol % of pyromellitic dianhydride (PMDA) and
  at least one diamine component (B) is a mixture of p-phenylenediamine (p-PDA), m-phenylenediamine (m-PDA) and 4,4'-diaminodiphenyl ether (ODA).

Preferably, the inventive shaped bodies are produced from a raw powder comprising a polyimide powder which in turn consists of a polyimide polymer formed from:
  at least one aromatic, especially preferred one, tetracarboxylic dianhydride component (A), which consists to an extent of 60 to 100 mol % of 3,3',4,4'-biphenyltetracarboxylic dianhydride (BPDA) and to an extent of 40 to 0 mol % of pyromellitic dianhydride (PMDA), and
  at least one aromatic, especially preferred one, diamine component (B), which is a mixture of p-phenylenediamine (p-PDA), m-phenylenediamine (m-PDA) and 4,4'-diaminodiphenyl ether (ODA).

The inventive polyimide powder particularly suitable for the direct forming process has a BET surface area in the range from 10 to 200 $m^2/g$, preferably in the range from 20 to 150 $m^2/g$, more preferably from 40 to 120 $m^2/g$ and most preferably from 60 to 100 $m^2/g$. If the specific BET surface area is too small, the material loses its direct forming capacity, and it is not possible to produce parts having sufficient mechanical properties by this process.

The aromatic tetracarboxylic dianhydride component (A) consists preferably to an extent of 65 to 100 mol % of BPDA and to an extent of 35 to 0 mol % of PMDA, more preferably to an extent of 70 to 100 mol % of BPDA and 30 to 0 mol % of PMDA, most preferably to an extent of greater than or equal to 95 mol % of BPDA and especially preferably to an extent of 100 mol % of BPDA. In an alternative embodiment, it consists preferably to an extent of 65 to 95 mol % of BPDA and to an extent of 35 to 5 mol % of PMDA, especially preferably to an extent of 67 to 90 mol % of BPDA and 33 to 10 mol % of PMDA. The choice of tetracarboxylic dianhydride has an influence on the glass transition point of the polyimide polymer. This rises with increasing PMDA content. A rising glass transition point leads in turn to a rising sintering temperature, and increases the inherent viscosity. Therefore, the processibility of the inventive polyimide powder in the hot compression moulding process worsens. In the case of a PMDA content exceeding about 40 mol %, there is a rise in weight loss, while the thermooxidative stability of the material decreases.

The diamine component (B) consists preferably to an extent of 60 to 99 mol % of PDA and to an extent of 40 to 1 mol % of ODA, preferably to an extent of 65 to 95 mol % of PDA and to an extent of 35 to 5 mol % of ODA, and more preferably to an extent of 65 to 80 mol % of PDA and 35 to 20 mol % of ODA. The ratio of PDA to ODA likewise has an influence on the glass transition point of the polyimide. This falls with rising ODA content. An excessively low glass transition point leads to inadequate thermal stability. In the case of an ODA content exceeding 40 mol %, there is a rise in weight loss, while the thermooxidative stability of the material decreases.

In the context of the present invention, "FDA" represents a mixture of p-PDA and m-PDA, where the ratio of p-PDA to m-PDA is preferably in the range from 5:95 to 95:5, more preferably in the range from 20:80 to 95:5, even more preferably in the range from 50:50 to 95:5, especially preferably in the range from 60:40 to 85:15 and very especially preferably in the range from 60:40 to 70:30. The ratio of p-PDA to m-PDA has an influence on the glass transition point of the polyimide and processing by the direct forming process. Polyimides having a relatively high proportion of m-PDA diamine have a relatively high glass transition point. Polyimides comprising mixtures of p-PDA and m-PDA have better direct forming capacity, and give rise to mouldings having better mechanical properties than mouldings formed from polyimides having only either of the isomers in pure form.

As already mentioned, the composition of the inventive polymer ensures that the inventive mouldings and the inventive powder have very good thermooxidative stability. Thus, the weight loss of the untreated inventive powder after a residence time of 400 to 1400 min in an air stream at 400° C. is in the range from 0.25% to 0.5% by weight. In comparison, the P84® NT products are at weight losses exceeding 2% by weight under the same conditions. A polyimide consisting only of PMDA and ODA, for example Vespel SP, has a weight loss under these conditions of 1.5% by weight.

The inventive polyimide powder preferably has an inherent viscosity in concentrated sulphuric acid prior to the production of the mouldings and the sintering of 10 to 100 ml/g, preferably 15 to 80 ml/g and more preferably 20 to 50 ml/g. The inherent viscosity, as a measure of the molar mass of the inventive polyimides, which are otherwise insoluble in aprotic dipolar solvents, has an influence on the mechanical properties of the mouldings produced therefrom. If the inherent viscosity is too small, the mechanical properties for industrial use of the moulding worsen.

In addition, the inventive polyimide powder preferably has a particle size d90 of 1 to 300 μm, preferably of 5 to 150 μm, more preferably of 10 to 100 μm and especially preferably of 15 to 80 μm. The particle size affects the direct forming properties of the inventive polyimide powder. Powders having relatively small particle size have better processibility by the direct forming process and give rise to mouldings having better mechanical properties.

A preferred process for producing the inventive polyimide powder comprises the following steps:
i) preparing a polyamide acid from at least one tetracarboxylic dianhydride component (A) and a diamine component (B) in an aprotic dipolar solvent,
ii) imidizing the polyamide acid,
iii) precipitating the polyimide formed,
iv) washing the polyimide powder,
v) drying the polyimide powder,
where steps ii) and iii) can be executed separately or together in one step, and steps iv) and v) can be executed in the sequences described below.

In step i), preferably BPDA or a mixture of BPDA and PMDA as component (A) is reacted with a mixture of p-PDA, m-PDA and ODA as component (B) in an aprotic dipolar solvent.

The respective ratios of BPDA and PMDA, and of p-PDA, m-PDA and ODA, in components (A) and (B) are chosen as described above.

Aprotic dipolar solvents used are preferably dimethyl sulphoxide, dimethylformamide, dimethylacetamide, N-methylpyrrolidinone, N-ethylpyrrolidinone, sulpholane, pyridine or mixtures thereof.

The reaction can be conducted in such a way that the diamines are initially charged and the dianhydrides are added, but is also possible to initially charge the dianhydrides and to add the diamines. The second component can be added in portions, but preference is given to a continuous addition.

The reaction is effected preferably at −10 to 80° C., most preferably at 0 to 30° C., because the reaction is exothermic and the polyamide acid imidizes at higher temperatures. The water released degrades the polyamide acid by autocatalytic hydrolysis.

Step i) forms a polyamide acid, which is converted to a polyimide in the subsequent steps. The standard imidization methods from the literature should be employed here, for example thermal imidization or chemical imidization.

Chemical imidization is preferably effected with a base, more preferably with a tertiary nitrogen base, especially pyridine or triethylamine, and preferably a dehydrating agent, more preferably acetic anhydride, trifluoroacetic anhydride or acetyl chloride or thionyl chloride.

Since chemical imidization gives rise to an insoluble polyimide, this precipitates out straight after the addition of the imidizing agent, or forms a gel which has to be comminuted and washed. Controlling the particle size of the inventive powder is difficult; therefore, preference is given to thermal imidization.

More preferably, since it is very economically viable, thermal imidization is effected as follows:

The polyamide acid from step i) is passed, preferably continuously, more preferably below the surface, i.e. below the liquid surface, into a boiling aprotic dipolar solvent, and the polyamide acid is thus thermally imidized and converted to a polyimide with elimination of water. The water of reaction formed is removed from the system continuously, preferably by distillation. The polyimide formed is insoluble and precipitates out. Introduction below the surface has the advantage of preventing the stirrer shaft and the blades from becoming covered by polyamide acid introduced.

The aprotic dipolar solvent used is preferably the same solvent as in stage i).

The polyamide acid is introduced into the boiling aprotic dipolar solvent while stirring. The solvent preferably contains an acid or an amine as catalyst and optionally a precipitation auxiliary, in order to catalyse the imidization reaction. Preference is given to using acids, particular preference to using mineral acids or organic acids, very particular preference to using phosphoric acid or benzenephosphonic acid, as catalyst in amounts of 0.1% to 3% by weight, based on the polyamide acid, preferably 0.25% to 2% by weight. Since water has to be removed from the reactor in the course of imidization, it is preferable not to introduce any unnecessary water with the catalyst. It is therefore preferable to use very substantially anhydrous, more preferably anhydrous, catalysts.

When the imidization has occurred, the polyimide precipitates out as a fine solid, meaning that steps ii) and iii) are combined to one step.

The water of imidization formed in the reaction is preferably removed from the system by simple continuous distillation. This does not require any azeotroping agent which forms a ternary boiling mixture with water, for example toluene or xylene. A sufficient amount of solvent is removed from the system that the contents of the reactor remain constant even in the case of continuous supply of polyamide acid. In contrast to batchwise operation (heating of a polyamide acid in a solvent up to the boiling point), the continuous addition gives rise only to a small amount of water per unit time, which can be removed quickly and easily from the system by distillation. This distinctly suppresses hydrolysis of the polyamide acid by the water of imidization. Furthermore, the reaction is effectively pseudo-diluted, since only a small amount of polyamide acid is ever in solution. Therefore, very small particles (<100 μm) can be produced. The more dilute the working concentration, the smaller the particle size. A high solids content in the resulting suspension promotes the agglomeration of the particles, and therefore a coarser polyimide powder is obtained. No grinding process is necessary. On completion of addition and any further reaction time of about 1 to 2 h, preferably at the solvent boiling temperature, the suspension is cooled and worked up.

The particle size of the inventive polymer powder can be controlled to a crucial degree through addition of additives, preferably precipitation auxiliaries, to the aprotic dipolar solvent prior to the start of the imidization step. The addition of the additives accelerates the nucleation of the polymer particle in the course of precipitation. Preferably inorganic substances insoluble in the solvent are used, more preferably fumed silica (Aerosil), pyrogenic metal oxides (Aeroxide AluC), graphite or alkali metal salts. Preference is given here to using additives which are also used for the compounding of the powder (graphite) or which have no influence at all on thermooxidative stability (fumed silicas). The concentration of the additives should be between 0.01% and 1% based on the initial charge of solvent, preferably between 0.03% and 0.7%, especially preferably between 0.05% and 0.5%.

The solvent boiling temperature should be between 140° C. and 300° C., preferably between 145° C. and 180° C. and most preferably between 150° C. and 170° C. In the case of high-boiling solvents, the boiling point can also be reduced or adjusted by applying a reduced pressure. If the temperature is too low, the imidization rate falls. If the temperature chosen is too high, there may be caking of the polyimide particles.

In a specific embodiment of the process according to the invention, the imidization process is conducted continuously in two or more stirred tanks connected in a cascade, in which case a polyamide acid solution from step i) is introduced continuously into a boiling aprotic dipolar solvent in the first of the stirred tanks, a portion of the solvent is distilled off to remove the water of imidization, the excess suspension is passed into the second stirred tank and a portion of the solvent is again drawn off therein for removal of the water of imidization, and the finished suspension is finally withdrawn from the last tank of the stirred tank cascade. This process has the advantage that it is a continuous process and hence a very homogeneous product can be produced.

The powder is generally in a solvent-containing suspension after the imidization. In this case, it is preferable to free the powder of the solvent and of the catalyst.

A preferred method is the evaporation of the solvent, preferably via spray-drying (step v)), followed by an extraction of the powder with water in step iv), for removal of the catalyst.

Another method, which is likewise preferred, is the displacement of solvent and catalyst by a displacement wash in step iv). This involves admixing the suspension with water and filtering. The resultant filtercake or the concentrated suspension is admixed again with water and filtered again. The operation is repeated until the solvent and the catalyst have been washed out. Filter materials used may, for example but not exclusively, be metal fabrics, glass frits, fabric filters and membranes.

A particularly preferred method for washing the powder is the use of a crossflow filtration process which uses a porous membrane. This retains the powder, and the liquid phase passes through the membrane. Thus, the solvent and the catalyst can be discharged by a displacement wash, such that only a minimal amount of solvent and/or catalyst remains in the system.

The powder suspension or the wet filtercake is then dried in step v) by conventional drying processes, for example but not exclusively thin-film evaporators, spray dryers, spray granulators, drying cabinets, horizontal and vertical dryers or heatable suction filters. Drying is effected preferably at temperatures of 50 to 200° C., more preferably 50 to 150° C., even more preferably 60 to 140° C., especially preferably at 70 to 130° C. and very especially preferably 80 to 120° C. Drying at high temperatures can lead to an unwanted reduction in the specific BET surface area, such that the powder can only be processed by the hot compression moulding process.

If the inventive powder is to be processed by means of hot compression moulding, it also has to be heated to at least 250° C. after drying, in order firstly to achieve complete post-imidization and secondly to ensure removal of volatile constituents. This is necessary in order to prevent cavity formation and hence defects during the hot compression moulding process.

The inventive powder is preferably washed until the solvent content is less than or equal to 1% by weight, preferably 0.001% to 0.5% by weight, more preferably <0.1% by weight and most preferably <0.01%. A higher proportion of volatile constituents would otherwise disrupt the process in the hot compression moulding and in the direct forming.

The inventive powder is of very good processibility by the hot compression moulding process. If the BET surface area of the inventive powder is within the abovementioned preferred range, the particular combination of polymer composition and specific BET surface area achieves the effect that the inventive polyimide powder also has excellent direct forming capacity. The inventive powder additionally exhibits, by virtue of its thermooxidative stability, distinct advantages over P84 NT1 and P84 NT2 and over Sintimid 1000®.

For the production of shaped bodies, it is possible as well as the inventive polyimide powders also to add other polyimide powder and/or additives to the raw powder. For this purpose, compounds are produced from the polyimide powder(s) and the additives.

In principle, possible additives are all of those that withstand the hot compression moulding or direct forming process undamaged. Nonexclusive examples include the following fillers: polytetrafluoroethylene, graphite, molybdenum disulphide, boron nitride, metal oxides, carbon and glass fibres, calcium carbonate, barium sulphate, metals, silicon dioxide and mixtures of the aforementioned substances. The amount of additive, preferably a filler or a filler mixture, may, based on the amount of the polymer, be between 0.1% by weight and 90% by weight.

The compounds can be produced by three different processes.

Process 1:

In this process, the additive is introduced in the imidization step ii). Before the start of the imidization, the additive is suspended in the boiling solvent. In the case of some fillers in particular (e.g. graphite, molybdenum disulphide, carbon fibres), the imidization achieves coating with the inventive polymer. This improves the adhesion between the filler and matrix, and increases the mechanical stabilities of the compounds. The thickness of the polyimide powder sheath of the additive is preferably between 0.1 µm and 50 µm.

Process 2:

Once the polymer suspension has been freed of the solvent and of the catalyst as described above, the additive, preferably a filler, can be stirred into the aqueous suspension. The separation and drying processes described above produce a very homogeneous compound.

Process 3:

After the polymer suspension has been dried, an inventive powder is obtained. The additive, preferably a filler, can be added to this powder in a suitable dry mixer. A good mixture can be achieved only through a high shear input, in order that any aggregates are broken up.

As already mentioned several times, shaped bodies can be produced from the inventive polyimide powder or the inventive compounds. More preferably, the shaped bodies are produced by means of direct forming or hot compression moulding processes. Other possible processes include, for example, hot coining or ram extrusion.

In the preferred direct forming process, a pressing is first formed by pressing a raw powder comprising or consisting of the inventive polyimide powder(s) or composite at high pressures of 0.1 to 10 to/cm$^2$, preferably 2 to 7 to/cm$^2$, at a temperature between 0° C. and 100° C., preferably between 15 and 40° C. The pressings (called green parts) obtained, preferably having a density >1.20 g/ml, more preferably 1.25 to 1.5 and most preferably 1.25 to 1.4 g/ml, are then sintered, preferably in an air or protective gas atmosphere, for example nitrogen, at temperatures of 250 to 600° C., preferably 300 to 500° C., more preferably at 350 to 480° C. and most preferably at 350 to 450° C., for 0.1 to 10 and preferably for 1 to 3 hours. More preferably, the parts are heated in the sintering oven with a ramp of 0.1 to 5° C./min, especially preferably at 0.5 to 2° C./min, up to the final sintering temperature.

In a preferred hot compression moulding process, a shaped body is produced by pressing a raw powder comprising or consisting of the inventive powder(s) or composite at pressures of 100 to 1000 bar, preferably 300 to 500 bar, and a temperature above the glass transition point of the polymer, preferably at 300 to 500° C., until sintering is complete.

The inventive mouldings (the terms "shaped bodies" and "mouldings" are used synonymously) are used for production of shaped polymer bodies after standard mechanical and thermal processing and forming processes, especially as tongs in the glass industry or as bearings and roller bushings, gaskets and gasket rings, guides, valve seats, shut-off valves, brake linings, valves in turbochargers or compressors, bearing components such as cages or balls, spark plugs, test sockets and wafer holders in the electronics industry, electrical and thermal insulation components, piston rings for compressors, pressure rings for gearboxes, radiation- and chemical-resistant pipe seals, friction linings, synthetic resin-bound diamond tools or ferrules in gas chromatography.

Methods of Measurement:

Specific BET Surface Area:

Prior to the measurement, the samples are degassed at 50° C. down to a pressure of 9 µm Hg. The nitrogen sorption measurement is subsequently conducted on a Micromeritics ASAP 2020 at a temperature of 77 K. The specific surface area is calculated by the model of Brunauer, Emmett and Teller (BET).

Determination of Molecular Weight $M_w$, $M_p$ and $M_n$ of the Polyamide Acids

Molar mass is determined by gel permeation chromatography. Calibration is against polystyrene standards. The molar masses reported are therefore to be understood as relative molar masses.

Components and settings used were as follows:
HPLC WATERS 600 pump, 717 autoinjector, 2487 UV detector
Precolumn PSS SDV precolumn
Columns PSS SDV 10 µm 1000, $10^5$ and $10^6$ Å
Eluent 0.01M LiBr+0.03M $H_3PO_4$ in DMF (sterile-filtered, 0.45 µm)
Flow rate 1.0 ml/min
Run time 45 min
Pressure ~1550 psi
Wavelength 270 nm (with use of UV detector)
Injection volume 50 µl or 20 µl (for solutions c>1 g/l)
Standards PS (polystyrene) standards (narrow distribution, 300-3·$10^6$, PSS)

Testing of Thermooxidative Stability:

About 10 mg of the polymer powder to be examined (raw powder without PTFE addition) are heated to 400° C. at 5° C./min in a stream of synthetic air. The weight loss over time is then monitored. The analysis result is the weight loss within 1000 min between a run time of 400 and 1400 min.

Determination of Inherent Viscosity:

Inherent viscosity is determined by determining the kinematic viscosity by means of an Ubbelohde viscometer. For this purpose, 250 mg of the polyimide powder are weighed into a 50 ml flask and admixed in a ⅔ ratio with concentrated sulphuric acid. On completion of dissolution, the flask is made up to 50 ml with conc. sulphuric acid and then filtered. Thereafter, the solution is transferred into the Ubbelohde capillary. The measurement itself is conducted at 25° C.

Powder Particle Size Measurement (Dry, Wet)

The measurement of the powder particle size is conducted by means of a Malvern Mastersizer 2000, and is determined both directly from the precipitated suspension and from the dried powder. For the determination of the particle size distribution in the suspension the HydroS wet dispersing unit is used, and for the determination of the powder the Scirocco dry dispersing unit. The principle of the measurement is based on laser diffraction, with measurement of the intensity of the scattered light of a laser beam that penetrates a dispersed sample. According to the Fraunhofer theory, smaller particles generate a greater scattering angle. From the diffraction pattern obtained, the size of the particles and a statistical distribution are calculated. For the measurement by means of a wet dispersing unit a few drops are required, and for the measurement by means of a dry dispersing unit 2-3 g (according to bulk density) of the sample.

Determination of the Density of the Green Part or Sintered Part

To determine the density of the mouldings, the parts are weighed and measured by means of sliding calipers. The measured data are subsequently used to calculate the density of the respective moulding.

Determination of Compressive Strength, Flexural Strength, Modulus of Elasticity and Elongation The compressive strength of the sintered moulding is determined by means of the Zwick Z050 universal tester with a 50 kN load cell to the standard EN ISO 604. The testing speed is 2 mm/min. The modulus of elasticity, maximum force and elongation at maximum force are evaluated. The flexural strength of the sintered moulding is determined by means of the Zwick Z050 universal tester with a 1 kN load cell to the standard EN ISO 178. The testing speed is 10 mm/min. The modulus of elasticity, maximum force and elongation at break are evaluated.

The examples which follow serve to provide more particular elucidation and better understanding of the present invention, but do not limit it in any way.

EXAMPLE 1

Preparation of the Polyamide Acid

A 130 l reactor equipped with a reflux condenser, reactor cooling, stirrer and nitrogen purge is initially charged with 1468 g (7.333 mol) of 4,4'-oxydianiline, 529 g (4.889 mol) of m-phenylenediamine and 1057 g (9.778 mol) of p-phenylenediamine, and they are dissolved in 90760 g of DMF. The clear solution is then cooled to 15° C. In several steps, 6300 g (21.413 mol) of 3,3',4,4'-biphenyltetracarboxylic dianhydride (BPDA) are added, as a result of which a slow increase in the viscosity of the solution is observed. For better control of the process, 128 g (0.587 mol) of pyromellitic dianhydride (PMDA) dissolved in 1152 g of DMF are additionally metered in, which further increases the viscosity. After the increase in viscosity has ended, this viscous solution is stirred at 15° C. for 3 h and then pumped into a reservoir vessel for the subsequent imidization. The operation of polyamide acid preparation is repeated once more, such that 200 kg of polyamide acid solution are available.

The gel permeation chromatography of the polyamide acid has a molar mass $M_n$ of 137047 Da, $M_w$ of 396919 Da and $M_p$ of 356559 Da.

EXAMPLE 2

Preparation of the Polyimide

A 250 l reactor with a distillation column and reflux condenser, stirrer, heater and metering reservoir is initially charged with 90 kg of DMF, and 1 kg of phosphoric acid is dissolved therein. The solution is heated to boiling. Subsequently, the polyamide acid prepared in Example 1 is metered into the boiling solvent at a rate of 43 kg/h, while 32 kg of condensate/h are simultaneously withdrawn at the top of the distillation column. Even after a small addition, a precipitate of imidized polymer powder forms. On completion of addition, the suspension is reacted for another 2 hours with the solvent boiling and, if necessary, condensate is withdrawn at the top of the still.

The suspension is cooled to room temperature and diluted with water. The suspension is subsequently washed with water by means of a crossflow filtration until the suspension has a DMF content of <0.1%. Subsequently, the suspension is thickened, 0.5% PTFE is mixed in and the mixture is dried in a spray drier with a centrifugal atomizer at gas temperature 130° C.

The dried polyimide powder has a particle size of d(0.1) =9.7 μm, d(0.5)=34.4 μm and d(0.9)=69.2 μm. Thermogravimetry studies on the powder show a loss of mass of 0.41%. Measurement of the BET nitrogen sorption gives a specific surface area of 72.9 m²/g. The inherent viscosity of the polyimide powder is 29.48 cm³/g.

EXAMPLE 3

Production of a Polyimide Powder with Smaller Particle Size

The production of the polyimide powder is conducted analogously to the method described in Examples 1+2. For the polyamide acid, 1702 g (8.500 mol) of 4,4'-oxydianiline, 613 g (5.667 mol) of m-phenylenediamine and 1226 g (11.333 mol) of p-phenylenediamine are initially charged and dissolved in 89348 g of DMF, and the solution is cooled to 15° C. In several steps, 7503 g (25.500 mol) of 3,3',4,4'-biphenyltetracarboxylic dianhydride (BPDA) are added, as a result of which a constant increase in the viscosity of the solution is observed. After stirring at 15° C. for 3 h and a further rise in viscosity, the polyamide acid is pumped out and the synthesis is repeated, such that 200 kg of polyamide acid solution are available.

For imidization of the polyamide acid, 90 kg of DMF are initially charged and 1 kg of phosphoric acid is dissolved therein. Subsequently, 0.225 g of a 30% dispersion of Aerosil A200 in NEP (0.075% based on initial charge of DMF in the liquid phase) is added. The imidization in boiling DMF and the further workup proceed analogously to the process described in Example 2.

The dry polyimide powder has a particle size of d(0.1) =13.28 μm, d(0.5)=27.49 μm and d(0.9)=47.71 μm. The BET measurement of nitrogen sorption gives a specific surface area of 89.91±0.19 m2/g. The inherent viscosity of the polyimide powder is 28.99 cm³/g.

EXAMPLES 4-8

Preparation of Novel Polyimides with Varying Composition of Dianhydrides and Diamines As well as BPDA as dianhydride, it is also possible to use a mixture of BPDA and PMDA. It is likewise possible to vary the composition of the diamines. This can also be used to produce other inventive polyimides.

For this purpose, the preparation of these polyimides is conducted on the laboratory scale on the basis of the methods in Examples 1 and 2:

In a 250 ml flask with a nitrogen purge, a defined mixture of the three diamines ODA/m-PDA/p-PDA is dissolved in DMF. The clear solution is then cooled to 15° C. In several steps, a defined amount of BPDA or a BPDA/PMDA mixture is added, as a result of which an increase in the viscosity of the solution is observed. This solution is then stirred at 15° C. for 12 h. The molecular compositions of the individual reaction mixtures for the polyamide acid are summarized in Table 1:

TABLE 1

| Example | BPDA [g/mol] | PMDA [g/mol] | ODA [g/mol] | m-PDA [g/mol] | p-PDA [g/mol] | DMF [g] |
|---|---|---|---|---|---|---|
| 4 | 14.711 (0.050) | — | 3.337 (0.017) | 2.403 (0.022) | 1.202 (0.011) | 175 |
| 5 | 9.807 (0.033) | 3.637 (0.017) | 3.337 (0.017) | 1.202 (0.011) | 2.403 (0.022) | 165 |
| 6 | 8.827 (0.030) | 4.364 (0.020) | 3.337 (0.017) | 1.202 (0.011) | 2.403 (0.022) | 163 |
| 7 | 29.422 (0.100) | — | 6.007 (0.030) | 6.488 (0.060) | 1.081 (0.010) | 348 |
| 8 | 17.653 (0.060) | 8.725 (0.040) | 2.002 (0.010) | 2.163 (0.020) | 7.570 (0.070) | 308 |

A 500 ml flask with a distillation column, mechanical stirrer and dropping funnel with a nitrogen purge is initially charged with 250 g of DMF. 2.5 g of phosphoric acid are dissolved therein and the solution is heated to boiling. Then 160 ml of the respective polyamide acid solution is slowly added dropwise, while the same volume of condensate is simultaneously withdrawn at the top of the distillation column. Even after a small addition, a precipitate of imidized polymer powder forms. On completion of addition, the suspension is reacted for another 2 hours with the solvent boiling and, if necessary, condensate is withdrawn at the top of the still.

The suspension is cooled to room temperature and diluted with water. Then the polymer powder is washed with water to free it of DMF, removed by means of a sintered glass suction filter and dried at 70° C./reduced pressure.

The characteristic particle sizes, glass transitions and weight losses of the polyimides are summarized in Table 2.

TABLE 2

| Example | Particle size d(0.1) [μm] | Particle size d(0.5) [μm] | Particle size d(0.9) [μm] | $T_g$ (DMTA) [° C.] | TGA loss 1000 min/ 400° C. [%] |
|---|---|---|---|---|---|
| 4 | 37.76 | 62.59 | 92.86 | 304.5 | 0.320 |
| 5 | 24.35 | 42.06 | 81.23 | 331.5 | 0.269 |
| 6 | 24.24 | 43.50 | 98.18 | 335.0 | 0.325 |
| 7 | 9.30 | 32.19 | 67.12 | | 0.283 |
| 8 | 12.75 | 21.28 | 32.57 | | 0.303 |

COMPARATIVE EXAMPLES 1-4

Preparation of Polyimides with Higher Proportions of PMDA

The polyamide acids are prepared on the basis of Examples 4-8. The molecular compositions of the individual reaction mixtures for the polyamide acid are compiled in Table 3 and, in Comparative Examples 2-4, are prepared on the basis of patent EP 1 236 756:

TABLE 3

| Comp. Example | BPDA [g (mol)] | PMDA [g (mol)] | ODA [g (mol)] | m-PDA [g (mol)] | p-PDA [g (mol)] | DMF [g] |
|---|---|---|---|---|---|---|
| 1 | 7.356 (0.025) | 5.453 (0.025) | 3.337 (0.017) | 1.202 (0.011) | 2.403 (0.022) | 160 |
| 2 | 2.942 (0.010) | 19.631 (0.090) | 2.002 (0.010) | 3.244 (0.030) | 6.488 (0.060) | 278 |
| 3 | 2.942 (0.010) | 19.631 (0.090) | 2.002 (0.010) | 2.163 (0.020) | 7.570 (0.070) | 278 |
| 4 | 2.942 (0.010) | 19.631 (0.090) | 2.002 (0.010) | 1.081 (0.010) | 8.651 (0.080) | 278 |

The imidization and precipitation of the polyimide powder is conducted on the basis of Examples 4-8, each time from 150 g of polyamide acid. The characteristic particle sizes, glass transitions and weight losses of the polyimides are compiled in Table 4.

TABLE 4

| Comparative Example | Particle size d(0.1) [μm] | Particle size d(0.5) [μm] | Particle size d(0.9) [μm] | $T_g$ (DMTA) [° C.] | TGA loss 1000 min/ 400° C. [%] |
|---|---|---|---|---|---|
| 1 | 23.82 | 44.04 | 113.90 | 346.0 | 0.547 |
| 2 | 5.23 | 8.68 | 15.15 | | 0.670 |
| 3 | 6.07 | 10.26 | 16.92 | | 0.508 |
| 4 | 2.55 | 18.95 | 38.63 | | 0.802 |

The results in Table 4 show that the inventive polymers have much better thermooxidative stability than polymers which are composed of the same monomers but in different ratios. Comparative Example 3 corresponds, for example, to a polymer according to EP 1 236 756 A1, formula 3, or Example 5, in which, according to paragraphs 17 and 18 of EP 1 236 756 A1, 10% PMDA was replaced by BPDA. Inventive Example 8 has an identical amine composition to Comparative Example 3, but the BPDA content is 60% and is thus at the lower end of the range claimed. It is found that Inventive Example 8, by virtue of the higher BPDA content which is explicitly impermissible in EP 1 236 756 A1, paragraph 17, has a much better thermooxidative stability than Comparative Example 3.

EXAMPLES 9-11

Dependence of Particle Size on Amount of Precipitation Auxiliary Added

For this purpose, the preparation of these polyimides is conducted on the laboratory scale on the basis of the methods described in Examples 4-8. The molecular composition of a typical polyamide acid is compiled in Table 5:

TABLE 5

| Example | BPDA [g (mol)] | ODA [g (mol)] | p-PDA [g (mol)] | m-PDA [g (mol)] | DMF [g] |
|---|---|---|---|---|---|
| 9-11 | 14.711 (0.050) | 3.337 (0.017) | 2.403 (0.022) | 1.202 (0.011) | 175 |

100 ml of this polyamide acid solution are used for each imidization. In an addition to the method from Examples 4-8, different amounts of a 30% suspension of fumed silica of the Aerosil A200 type in N-ethylpyrrolidone (NEP) (based on initial charge of solvent) are added to the 250 ml of solvent initially charged in the liquid phase before the imidization. The amounts of fumed silica used are compiled in Table 6:

TABLE 6

| Example | Proportion of Aerosil A200 based on initial charge of DMF [%] | Amount of 30% dispersion of Aerosil A200 in NEP |
|---|---|---|
| 9 | 0.01 | 0.083 g |
| 10 | 0.1 | 0.833 g |
| 11 | 1 | 8.333 g |

The imidization and further workup of the polyimide powders are conducted analogously to Examples 4-8.

The characteristic particle sizes of the polyimides are compiled in Table 7:

TABLE 7

| Example | Particle size d(0.1) [μm] | Particle size d(0.5) [μm] | Particle size d(0.9) [μm] |
|---|---|---|---|
| 9 | 25.371 | 41.962 | 64.386 |
| 10 | 7.210 | 15.519 | 31.755 |
| 11 | 6.820 | 17.054 | 32.825 |

EXAMPLE 12

Production of a Polyimide-Graphite Compound According to Process 1

For this purpose, the production of this polyimide-graphite compound is conducted on the laboratory scale on the basis of the methods described in Examples 4-11. The molecular composition of a typical polyamide acid thereof is compiled in Table 8:

TABLE 8

| Example | BPDA [g (mol)] | ODA [g (mol)] | p-PDA [g (mol)] | m-PDA [g (mol)] | DMF [g] |
|---|---|---|---|---|---|
| 12 | 73.555 (0.250) | 16.687 (0.083) | 12.016 (0.111) | 6.008 (0.056) | 876 |

100 ml of this polyamide acid solution are used for the imidization. In an addition to the method from Examples 4-8, 6.135 g of graphite are added to the 250 ml of solvent initially charged in the liquid phase before the imidization. The further imidization and further workup of the polyimide powders are conducted analogously to Examples 4-8.

The characteristic particle sizes of the polyimide-graphite compound are compiled in Table 9:

TABLE 9

| Example | Particle size d(0.1) [µm] | Particle size d(0.5) [µm] | Particle size d(0.9) [µm] |
|---|---|---|---|
| 12 | 8.640 | 17.616 | 33.136 |

EXAMPLE 13

Dependence of Specific Surface Area on Temperature

After preparation, the polyimide powder from Example 2 is dried under reduced pressure at temperatures of 180° C., 230° C. and 290° C. The powders are subsequently analysed for their specific surface area by means of nitrogen sorption. The specific surface areas are summarized in Table 10.

TABLE 10

| Drying temperature [° C.] | Specific BET surface area [m$^2$/g] |
|---|---|
| 130 | 72.92 ± 0.12 |
| 180 | 59.53 ± 0.09 |
| 230 | 49.63 ± 0.06 |
| 290 | 28.33 ± 0.21 |

COMPARATIVE EXAMPLES 5 AND 6

Study of the Thermooxidative Stability of P84® NT1 and P84® NT2 According to WO 2007/009652

The P84 NT1 and P84 NT2 powders produced according to WO 2007/009652 are studied with respect to their thermooxidative stability analogously to the powders produced in Examples 2-9. The corresponding values are reported in Table 11.

TABLE 11

| Comparative Example | | TGA loss 1000 min/400° C. [%] |
|---|---|---|
| 5 | P84 ® NT1 | 3.71 |
| 6 | P84 ® NT2 | 4.62 |

The results from Table 11, compared with the results from Table 2, show that the inventive powders have a better thermooxidative stability by a factor of 10 to 20 than the block copolymers from WO 2007/009652. An additional advantage is that the inventive polymers are homopolymers, which are much easier to prepare than the block polymers from WO 2007/009652.

EXAMPLE 14

Production of Compression Specimens by Direct Forming with Powders from Examples 2-5, 10, 13 and from Comparative Examples 5 and 6

In each case 1100 mg of the polyimide powders are introduced into the die of the compression mould (diameter 10 mm). The powder is then compressed with a defined pressure. The green parts are subsequently heated to the chosen temperature in an air atmosphere with a defined ramp and sintered at this temperature for 30 min. The sintered bodies are then analysed for their compressive strength. Tables 12 and 13 summarize the chosen pressing and sintering conditions.

TABLE 12

| Polymer from Ex. | Compression pressure [t/cm$^2$] | Green body density [g/cm$^3$] | Density of part sintered at 425° C. (1° C./min) [g/cm$^3$] | Density of part sintered at 410° C. (1° C./min) [g/cm$^3$] | Density of part sintered at 395° C. (1° C./min) [g/cm$^3$] | Density of part sintered at 410° C. (2° C./min) [g/cm$^3$] |
|---|---|---|---|---|---|---|
| 2 | 2 | 1.30 | 1.31 | | | |
|   | 3 | 1.34 | 1.33 | 1.33 | 1.33 | 1.33 |
|   | 4 | 1.35 | 1.35 | 1.33 | 1.34 | 1.33 |
|   | 5 | 1.36 | 1.34 | 1.34 | 1.35 | 1.34 |
|   | 6 | 1.36 | 1.34 | | | |
| 3 | 3 | 1.33 | 1.32 | 1.33 | 1.34 | |
|   | 4 | 1.34 | 1.33 | 1.34 | 1.34 | |
|   | 5 | 1.34 | 1.34 | 1.34 | 1.34 | |
| 4 | 2.8 | 1.29 | 1.25 | | | |
| 10 | 4 | 1.35 | | | 1.34 | |
| 13 (180° C.) | 4 | 1.30 | | | | 1.29 |
| 13 (230° C.) | 4 | 1.28 | | | | 1.25 |

TABLE 13

| Comparative Example | Compression pressure [t/cm$^2$] | Density of part sintered at 350° C. (1° C./min) [g/cm$^3$] | Density of part sintered at 380° C. (1° C./min) [g/cm$^3$] |
|---|---|---|---|
| 5 | 2.8 | 1.28 | |
| 6 | 2.8 | | 1.28 |

The characteristic compressive strengths, moduli of elasticity and elongation at maximum force are summarized in Tables 14 and 15.

TABLE 14

| Polymer from Ex. | Compression pressure [t/cm²] | Compressive strength of part sintered at 425° C. [MPa] | Modulus of elasticity of part sintered at 425° C. [MPa] | Elongation at max. force of part sintered at 425° C. [%] | Compressive strength of part sintered at 410° C. [MPa] | Compressive strength of part sintered at 395° C. [MPa] | Compressive strength or part sintered at 410° C. 2° C./min [MPa] |
|---|---|---|---|---|---|---|---|
| 2 | 2 | 239 | 1646 | 24.8 | | | |
|   | 3 | 262 | 1612 | 24.0 | 274 | 250 | 262 |
|   | 4 | 287 | 1728 | 34.4 | 279 | 275 | 277 |
|   | 5 | 291 | 1720 | 35.5 | 293 | 273 | 288 |
|   | 6 | 304 | 1717 | 37.4 | | | |
| 3 | 3 | 303 | 1805 | 36.5 | 292 | 289 | |
|   | 4 | 306 | 1815 | 37.6 | 310 | 292 | |
|   | 5 | 306 | 1848 | 36.7 | 304 | 303 | |
| 4 | 2.8 | 164 | 1109 | 20.1 | | | |
| 10 | 4 | | | | 291 | | |
| 13 (180° C.) | 4 | | | | | | 210 |
| 13 (230° C.) | 4 | | | | | | 140 |

TABLE 15

| Polymer from Comp. Ex. | Compression pressure [t/cm²] | Compressive strength of part sintered at 350° C. [MPa] | Modulus of elasticity of part sintered at 350° C. [MPa] | Elongtion at maximum force of part sintered at 350° C. [%] | Compressive strength of part sintered at 380° C. [MPa] | Modulus of elasticity of part sintered at 380° C. [MPa] | Elongation at maximum force of part sintered at 380° C. [%] |
|---|---|---|---|---|---|---|---|
| 5 | 2.8 | 392 | 1648 | 59 | | | |
| 6 | 2.8 | | | | 370 | 1578 | 57 |

The results for the mouldings of the polyimide powders according to Example 13 show that compressive strength decreases with higher drying temperature.

EXAMPLE 15

Production of Flexural Specimens by Direct Forming with Powders from Examples 2 and 3 and Comparative Examples 5 and 6

Flexural specimens in the dimensions according to ISO 178 are produced via the DF method from the inventive polyimide powder from Examples 2 and 3. Different pressures are employed. The green parts are subsequently heated to the chosen temperature under an air atmosphere with a defined ramp and sintered at this temperature for a defined period of time. The sintered bodies are then tested for their flexural strength.

Tables 16 and 17 summarize the pressing and sintering conditions selected.

TABLE 16

| Polymer from Ex. | Compression pressure [t/cm²] | Flexural strength of part sintered at 410° C. 1° C./min [MPa] | Modulus of elasticity of part sintered at 410° C. 1° C./min [MPa] | Elongation at maximum force of part sintered at 410° C. 1° C./mim [%] | Flexural strength of part sintered at 425° C. 0.5° C./min [MPa] | Flexural strength of part sintered at 440° C. 2° C./min [MPa] |
|---|---|---|---|---|---|---|
| 2 | 2.5 | 51.3 | 2662 | 2.01 | | |
|   | 3 | 57.3 | 2752 | 2.17 | | |
|   | 3.5 | 62.4 | 2897 | 2.26 | | |
|   | 4 | 64.6 | 2972 | 2.25 | | 67.8 |
|   | 4.5 | 70.1 | 3038 | 2.41 | | 72.3 |
| 3 | 3 | 135.7 | 3259 | 4.75 | 130.3 | 101.6 (0.2° C./min) |
|   | 4 | 138.9 | 3209 | 4.89 | 126.4 | 104.5 (0.2° C./min) |
|   | 5 | 139.7 | 3364 | 4.77 | 137.4 | 110.8 (0.2° C./min) |

TABLE 17

| Polymer from Comparative Example | Compression pressure [t/cm²] | Flexural strength of part sintered at 350° C. 1° C./min [MPa] | Modulus of elasticity of part sintered at 350° C. 1° C./min [MPa] | Elongation at maximum force of part sintered at 350° C. 1° C./min [%] | Flexural strength of part sintered at 380° C. 1° C./min [MPa] | Modulus of elasticity of part sintered at 380° C. 1° C./min [MPa] | Elongation at max. force of part sintered at 380° C. 1° C./min [%] |
|---|---|---|---|---|---|---|---|
| 5 | 2.8 | 110 | 2879 | 4.3 | | | |
| 6 | 2.8 | | | | 117 | 2825 | 5.0 |

EXAMPLES 16-18

Production of Compounds

The addition of additives can produce compounds with new properties. For this purpose, the powders produced in Examples 2 and 3 are mixed thoroughly with a defined content of graphite. The compositions of the powders are summarized in Table 18.

TABLE 18

| Example | Polymer from Ex. | Graphite [%] | Polymer [%] |
|---|---|---|---|
| 16 | 2 | 15 | 85 |
| 17 | 2 | 40 | 60 |
| 18 | 3 | 40 | 60 |

COMPARATIVE EXAMPLE 7

Production of Compounds from P84® NT2

The polymer from Comparative Example 6 is mixed with graphite in an analogous manner to Examples 16-18 to give the corresponding compounds.

The composition of the compound is summarized in Table 19.

TABLE 19

| Comparative Example | Polymer from Comparative Example | Graphite [%] | Polymer [%] |
|---|---|---|---|
| 7 | 6 | 40 | 60 |

EXAMPLE 19

Production of Compression Specimens by Direct Forming with Compounds from Examples 12, 16-18 and Comparative Example 7

The compounds produced with graphite in Examples 16-18 and in Comparative Example 7 can be processed via the direct forming process to give mouldings having new properties. The green parts were produced analogously to the method described in Example 14 and sintered analogously to the procedure described in Example 14. The compression and sintering conditions are summarized in Tables 20 and 21.

TABLE 20

| Compound from Example | Compression pressure [t/cm²] | Density of green part [g/cm³] | Density of sintered part [g/cm³] | Sintering temperature [° C.] | Heating ramp [° C./min] |
|---|---|---|---|---|---|
| 12 | 4 | | 1.54 | 410 | 2 |
| 16 | 3 | 1.40 | 1.41 | 410 | 2 |
| | 4 | 1.41 | 1.41 | 410 | 2 |
| | 5 | 1.42 | 1.42 | 410 | 2 |
| 17 | 3 | 1.55 | 1.57 | 410 | 2 |
| | 4 | 1.56 | 1.58 | 410 | 2 |
| | 5 | 1.57 | 1.58 | 410 | 2 |
| 18 | 4 | 1.56 | 1.58 | 410 | 1 |
| | | 1.56 | 1.58 | 425 | 1 |
| | | 1.56 | 1.58 | 440 | 1 |
| | 5 | 1.57 | 1.59 | 410 | 1 |
| | | 1.57 | 1.59 | 425 | 1 |
| | | 1.57 | 1.58 | 440 | 1 |
| | 6 | 1.58 | 1.59 | 410 | 1 |
| | | 1.58 | 1.59 | 425 | 1 |
| | | 1.57 | 1.59 | 440 | 1 |

TABLE 21

| Compound from Comparative Example | Compression pressure [t/cm²] | Density of sintered part [g/cm³] | Sintering temperature [° C.] | Heating ramp [° C./min] |
|---|---|---|---|---|
| 7 | 2.8 | 1.48 | 380 | 1 |

The sintered parts are subsequently tested for their compressive strength, modulus of elasticity and elongation at maximum force. The characteristic values of these are summarized in Tables 22 and 23:

TABLE 22

| Compound from Example | Compression pressure [t/cm²] | Sintering temperature [° C.] | Compressive strength of sintered part [MPa] | Modulus of elasticity of sintered part [MPa] | Elongation at maximum force [%] |
|---|---|---|---|---|---|
| 12 | 4 | 410 | 133.6 | 1171 | 10.3 |
| 16 | 3 | 410 | 183.4 | 1625 | 20.0 |
| | 4 | 410 | 179.9 | 1616 | 19.5 |
| | 5 | 410 | 186.2 | 1633 | 20.3 |
| 17 | 3 | 410 | 100.7 | 1552 | 8.1 |
| | 4 | 410 | 103.8 | 1510 | 8.9 |
| | 5 | 410 | 107.9 | 1487 | 9.6 |

TABLE 22-continued

| Compound from Example | Compression pressure [t/cm²] | Sintering temperature [° C.] | Compressive strength of sintered part [MPa] | Modulus of elasticity of sintered part [MPa] | Elongation at maximum force [%] |
|---|---|---|---|---|---|
| 18 | 4 | 410 | 111.0 | 1512 | 10.2 |
|  |  | 425 | 112.9 | 1548 | 9.8 |
|  |  | 440 | 116.0 | 1531 | 10.7 |
|  | 5 | 410 | 113.7 | 1528 | 10.5 |
|  |  | 425 | 117.4 | 1569 | 10.5 |
|  |  | 440 | 118.7 | 1593 | 10.7 |
|  | 6 | 410 | 117.0 | 1615 | 10.3 |
|  |  | 425 | 120.9 | 1679 | 10.8 |
|  |  | 440 | 120.5 | 1669 | 10.5 |

TABLE 23

| Compound from Comparative Example | Compressive strength of sintered part [MPa] | Modulus of elasticity of sintered part [MPa] | Elongation at maximum force [%] |
|---|---|---|---|
| 7 | 128 | 1389 | 21 |

EXAMPLE 20

Production of an HCM Pellet from Example 2

400 g of the inventive powder from Example 2 were heated to 150° C. under reduced pressure, kept at this temperature for 1 h and then heated to 315° C. with a ramp of 0.2° C./min. This temperature is then maintained for 24 h and then cooled down to room temperature under reduced pressure.

This conditioned powder is then introduced into the die of the press (Höfer hot press, die diameter 170 mm). The closed compression mould is then heated at 250° C. for 1 h and thereafter to 400° C. at 1.25° C./min. This temperature is then maintained for 3 h. The compression pressure is 0.4 t/cm². After the press has been cooled down, the final HCM part can be removed.

Subsequently, flexural specimens according to the standard EN ISO 178 are elaborated from this HCM part. These are subsequently tested for their flexural strength and modulus of elasticity.

Table 24 summarizes the mechanical properties of the HCM part made from the inventive powder.

TABLE 24

| Polymer from Ex. | Density of HCM part [g/cm³] | Flexural strength [MPa] | Modulus of elasticity of sintered part [MPa] | Elongation at maximum force 1° C./min [%] |
|---|---|---|---|---|
| 2 | 1.40 | 177.1 | 3851 | 6.81 |

The invention claimed is:

1. A shaped body produced from a raw powder comprising a polyimide powder comprising a polyimide polymer, wherein the polyimide polymer is composed of an aromatic tetracarboxylic dianhydride component (A) and a diamine component (B), wherein the aromatic tetracarboxylic dianhydride component (A) consists of 60 to 100 mol % of 3,3',4,4'-biphenyltetracarboxylic dianhydride (BPDA) and 40 to 0 mol % of pyromellitic dianhydride (PMDA) and the diamine component (B) consists of p-phenylenediamine (p-PDA), m-phenylenediamine (m-PDA) and 4,4'-diaminodiphenyl ether (ODA), and wherein the diamine component (B) consists of 60 to 99 mol % of PDA and 40 to 1 mol % of ODA, wherein PDA consists of p-PDA and m-PDA, and wherein the ratio of p-PDA to m-PDA is in the range from 5:95 to 95:5.

2. The shaped body of claim 1, wherein the raw powder for production of the shaped body further comprises 0.5% to 80% by weight of additives and/or the raw powder is a compound comprising additive(s) covered by the polyimide powder.

3. A process for producing shaped bodies which is a direct forming process, comprising:

compressing the raw powder defined in claim 1 at high pressures of 0.1 to 10 to/cm² at a temperature between 0° C. and 100° C. to yield green parts; and sintering the green parts at temperatures of 250 to 600° C., for 0.1 to 10 hours or compressing the raw powder in a hot compression moulding process at pressures of 100 to 1000 bar and a temperature above the glass transition point of the polyimide polymer, until sintering is complete.

4. A polyimide powder comprising a polyimide polymer composed of an aromatic tetracarboxylic dianhydride component (A) and a diamine component (B), wherein the aromatic tetracarboxylic dianhydride component (A) consists of 60 to 100 mol % of 3,3',4,4'-biphenyltetracarboxylic dianhydride (BPDA) and of 40 to 0] mol % of pyromellitic dianhydride (PMDA) and the diamine component (B) consists of p-phenylenediamine (p-PDA), m-phenylenediamine (m-PDA) and 4,4'-diaminodiphenyl ether (ODA), and wherein the diamine component (B) consists of 60 to 99 mol % of PDA and 40 to 1 mol % of ODA, wherein PDA consists of p-PDA and m-PDA, and wherein the ratio of p-PDA to m-PDA is in the range from 5:95 to 95:5.

5. The polyimide powder of claim 4, wherein the polyimide powder has a specific BET surface area in the range from 10 to 200 m²/g.

6. The polyimide powder of claim 4, wherein the aromatic tetracarboxylic dianhydride component (A) consists of 65 to 100 mol % of BPDA and 35 to 0 mol % of PMDA.

7. The polyimide powder of claim 4, wherein the polyimide powder has an inherent viscosity in concentrated sulphuric acid prior to the production of the mouldings and the sintering of 10 to 100 ml/g and/or the polyimide powder has a particle size d90 of 1 to 300 μm.

8. A process for producing a polyimide powder, comprising:
- i) preparing a polyamide acid from an aromatic tetracarboxylic dianhydride component (A), and a diamine component (B), wherein both (A) and (B) are defined according to claim 1, in an aprotic dipolar solvent;
- ii) imidizing the polyamide acid;
- iii) precipitating the polyimide formed;
- iv) washing the polyimide powder;
- v) drying the polyimide powder, wherein steps ii) and iii) can be executed separately or together in one step, and wherein steps iv) and v) can be executed in different sequences.

9. The process of claim 8, wherein the polyamide acid from step i), in step ii), is passed in the presence of a catalyst and optionally a precipitation auxilliary, into a boiling aprotic dipolar solvent and water of reaction formed is removed continuously from the system precipitating the polyimide formed, such that process steps ii) and iii) are combined with one another.

10. The process of claim 8, wherein the aprotic dipolar solvent used in step i) and/or ii) is a solvent selected from the group consisting of dimethyl sulphoxide, dimethylformamide, dimethylacetamide, N-methylpyrrolidinone, N-ethylpyrrolidinone, sulpholane, pyridine and mixtures thereof, and/or wherein step i) is conducted at a temperature between −10° C. and 80° C. and/or wherein an acid or an amine catalyst is used in step ii), and/or a substance which is insoluble in the solvent is used as precipitation auxiliary in step ii) or iii).

11. The process of claim 8, wherein the solvent is removed from a suspension obtained after step iii) by washing and/or by evaporation, and the catalyst is removed in step iv) and/or v) by washing.

12. The process of claim 8, wherein the polyimide powder is dried in step v) at temperatures of 50 to 200° C.

13. A process for producing compounds composed of a polyimide powder and additives, wherein the polyamide acid from process step i) or the polyimide powder from one of steps ii) to v) of claim 8, in dry form or in suspension, is mixed with additives, the amounts of additives based on the amount of polyimide or the polyamide acid, being between 0.1% by weight and 90% by weight.

14. A process for producing shaped bodies which is a direct forming process, wherein the raw powder of claim 2 is compressed at high pressures of 0.1 to 10 to/cm$^2$, at a temperature between 0° C. and 100° C. to yield green parts, and wherein the green parts obtained are then sintered at temperatures of 250 to 600° C., for 0.1 to 10 hours, or wherein the process is a hot compression moulding process, wherein the raw powder is compressed at pressures of 100 to 1000 bar and a temperature above the glass transition point of the polyimide polymer, until sintering is complete.

15. A process for producing shaped bodies which is a direct forming process, wherein the raw powder of claim 2 is compressed at high pressures of 2 to 7 to/cm$^2$, at a temperature between 15° C. and 40° C. to yield green parts, and wherein the green parts obtained are then sintered in an air or protective gas atmosphere at temperatures of 300 to 500° C., for 1 to 3 hours, or wherein the process is a hot compression moulding process, wherein the raw powder is compressed at pressures of 300 to 500 bar and at 300 to 500° C., until sintering is complete.

16. The shaped body of claim 1, wherein the raw powder further comprises from 1% to 70% by weight of additives and/or the raw powder further comprises additive(s) covered by the polyimide powder, the cover layer having a layer thickness of 0.1 μm to 50 μm.

* * * * *